United States Patent [19]

Mitchell et al.

[11] 4,372,433
[45] Feb. 8, 1983

[54] COMBINATION CLUTCH/BRAKE MECHANISM

[75] Inventors: Robert K. Mitchell; Robert K. Catterson, both of Brookfield, Wis.

[73] Assignee: Briggs & Stratton Corporation, Wauwatosa, Wis.

[21] Appl. No.: 139,880

[22] Filed: Apr. 14, 1980

[51] Int. Cl.³ ............... F16D 67/02; A01D 69/08
[52] U.S. Cl. .................. 192/18 R; 56/11.3; 192/93 A
[58] Field of Search ............ 192/18 R, 93 A; 56/11.3

[56] References Cited

U.S. PATENT DOCUMENTS

| | | | |
|---|---|---|---|
| 2,037,643 | 4/1936 | Voigt | 192/18 R |
| 2,135,384 | 11/1938 | Brownlee | 192/18 R X |
| 2,561,755 | 7/1951 | Recker | 192/99 S X |
| 3,127,969 | 4/1964 | Hansen | 192/93 A |
| 3,247,654 | 4/1966 | Nemeth et al. | 56/25.4 |
| 3,253,391 | 5/1966 | Meldahl | 56/25.4 |
| 3,613,815 | 10/1971 | Meylink et al. | 192/18 R X |
| 3,841,453 | 10/1974 | Culbertson | 192/18 R X |
| 3,871,159 | 3/1975 | Shriver | 56/11.3 |
| 3,878,926 | 4/1975 | Adachi | 192/18 R |
| 4,122,652 | 10/1978 | Holtermann | 56/11.3 |
| 4,141,439 | 2/1979 | Lunde et al. | 192/18 R |
| 4,148,173 | 4/1979 | Hoff | 56/11.3 |
| 4,205,509 | 6/1980 | Miyazawa | 192/18 R X |
| 4,226,313 | 10/1980 | Meldahl et al. | 192/18 R |
| 20985,992 | 5/1961 | Dowdle | 56/25.4 |

*Primary Examiner*—Rodney H. Bonck
*Attorney, Agent, or Firm*—Andrus, Sceales, Starke & Sawall

[57] ABSTRACT

A clutch/brake mechanism designed to reduce the possibility of its clutch and brake components being engaged simultaneously that includes axially fixed clutch and brake members (80 and 33) spaced from one another relative to the drive shaft (21) of a power source, and an axially movable carrier (65) arranged about the drive shaft. The carrier has wall surfaces defining a movable brake element (75) and a movable clutch element (76), the former being engageable with the fixed brake member (33) when the carrier is in one position and the latter being engageable with the clutch member (80) when the carrier is moved to another position.

2 Claims, 7 Drawing Figures

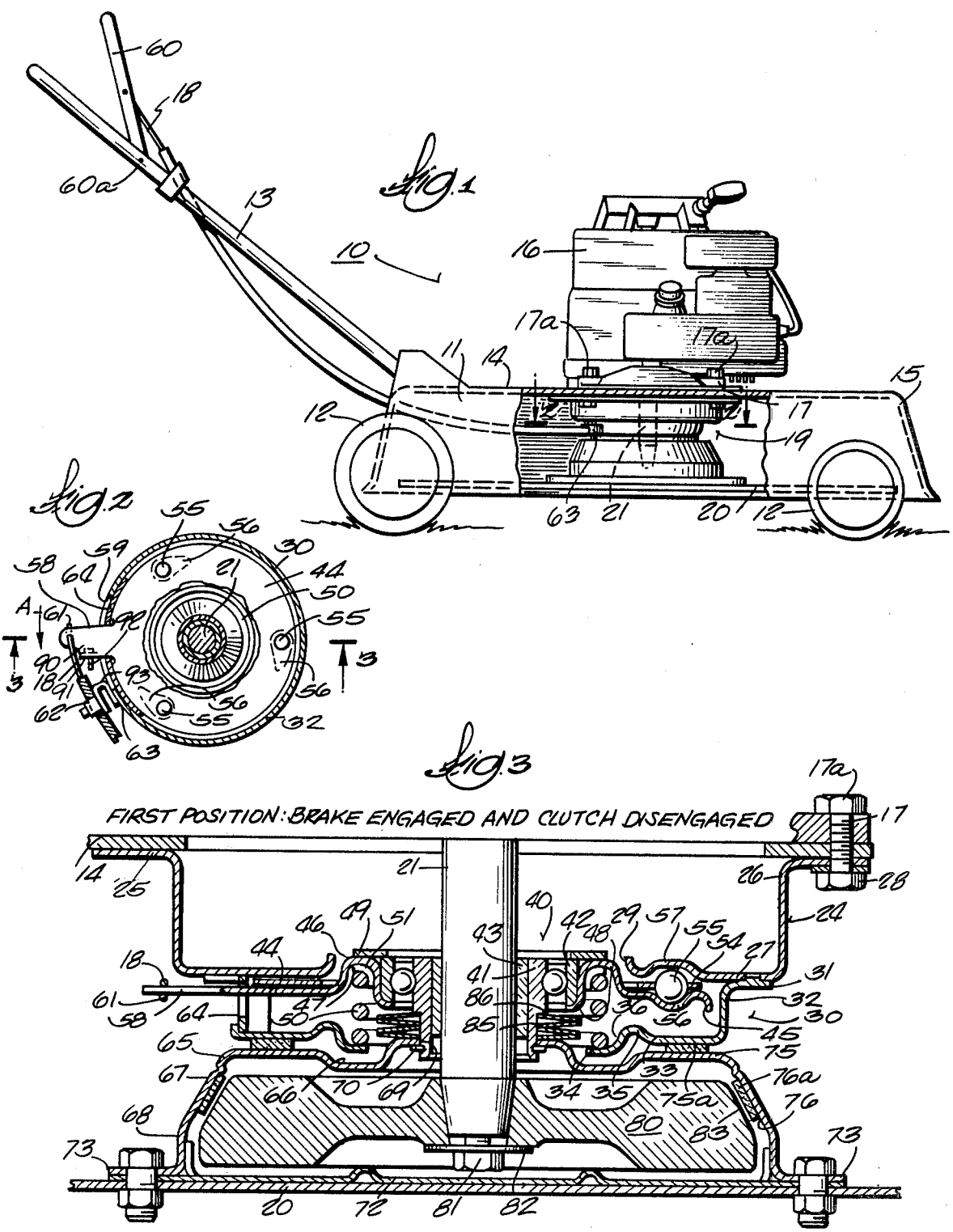

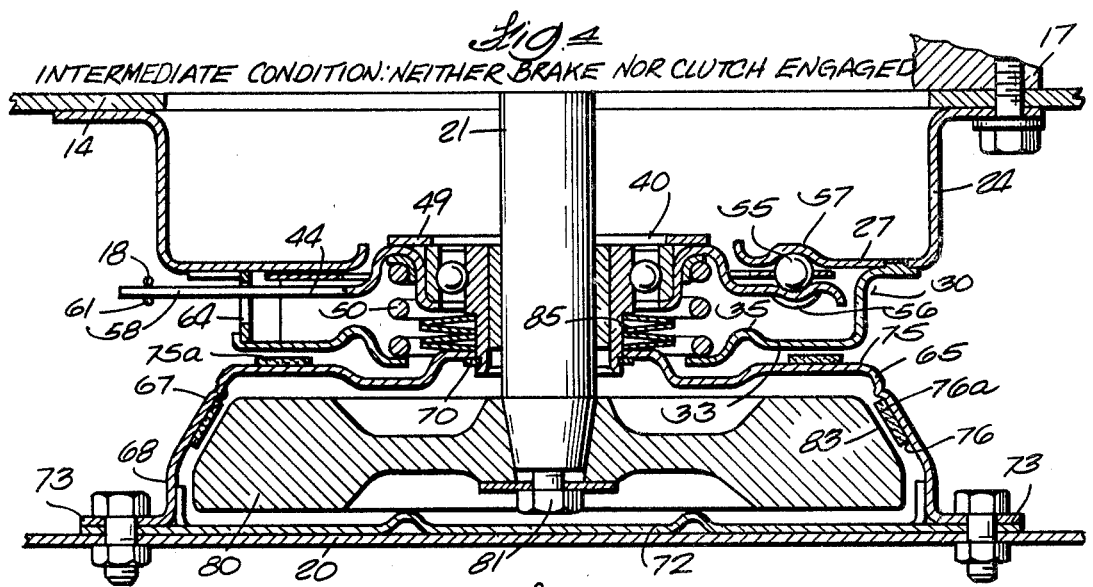
Fig. 4 INTERMEDIATE CONDITION: NEITHER BRAKE NOR CLUTCH ENGAGED
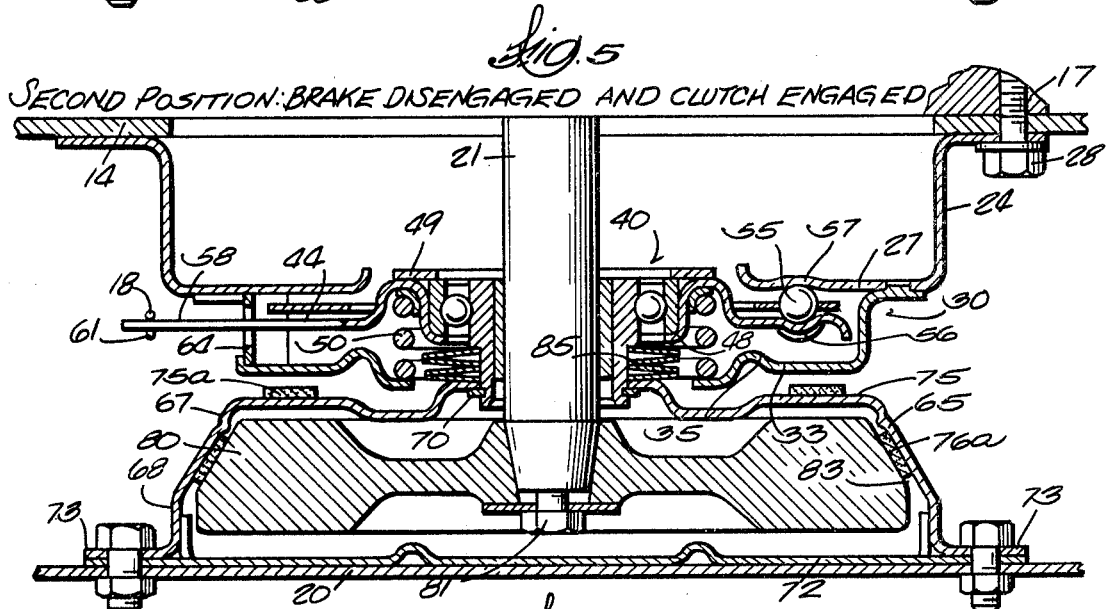
Fig. 5 SECOND POSITION: BRAKE DISENGAGED AND CLUTCH ENGAGED
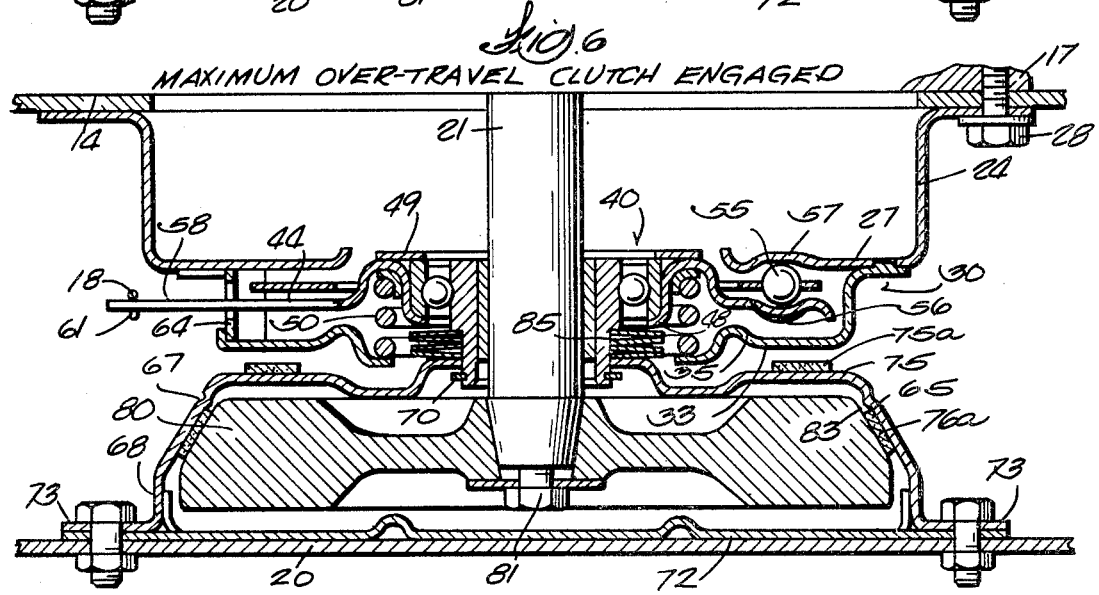
Fig. 6 MAXIMUM OVER-TRAVEL CLUTCH ENGAGED

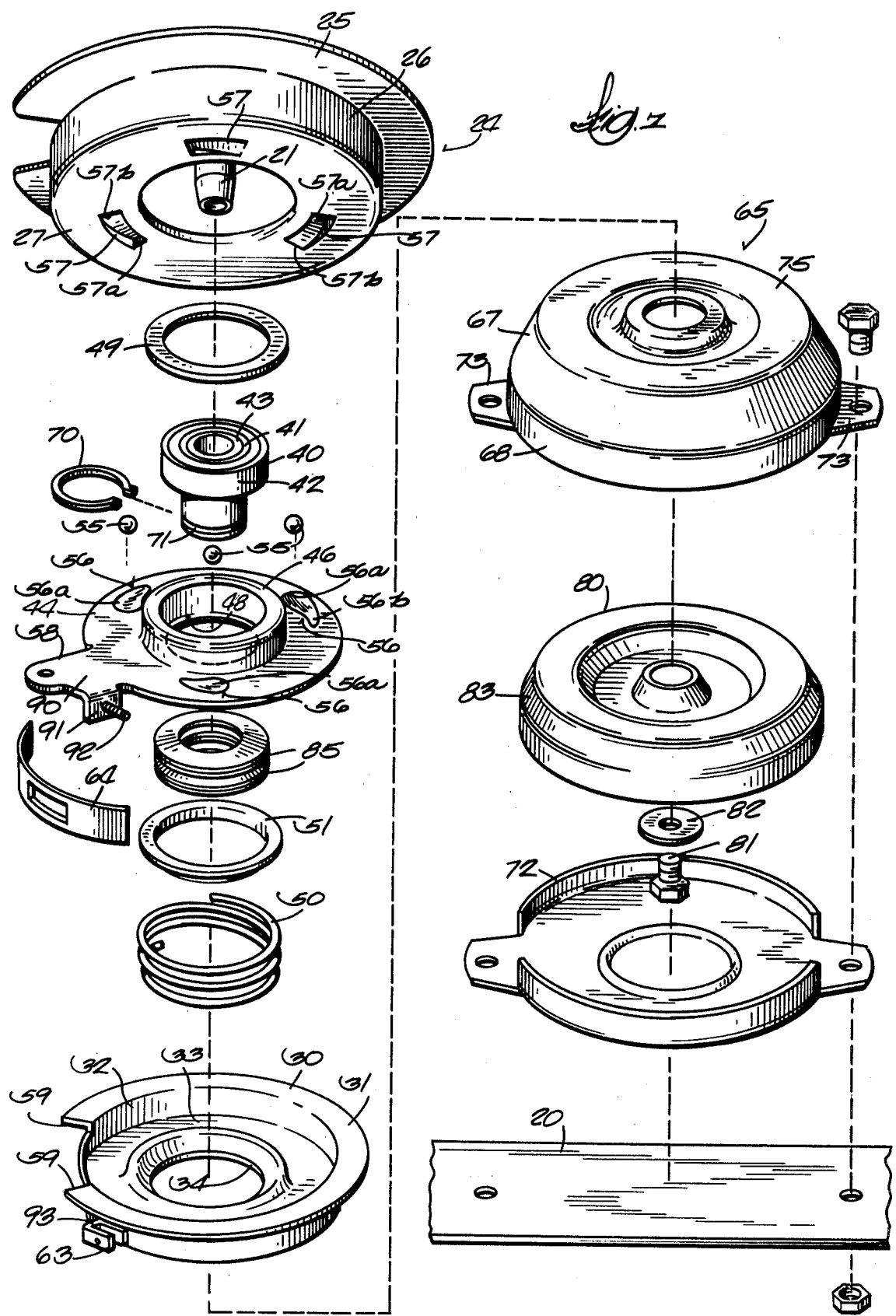

COMBINATION CLUTCH/BRAKE MECHANISM

TECHNICAL FIELD

This invention relates to the field of clutch/brake mechanisms for powered apparatus, such as rotary lawn mowers, adapted for clutching and declutching a driven element with an engine drive shaft and also adapted for braking the driven element when it is declutched.

BACKGROUND ART

When rotary lawn mowers began to replace conventional hand mowers they were relatively simple machines having a mower blade attached directly to the end of the crankshaft of a vertical shaft gasoline engine or other suitable power source mounted on the deck of the mower. However, for various reasons, the principal one being to minimize the safety hazards involved in the operation of walk-behind rotary lawn mowers, clutch/brake mechanisms have been proposed or developed to stop rotation of the mower blade while allowing the engine to continue running. The clutch/brake device is interposed between the mower blade and the crankshaft of the engine to selectively establish a torque transmitting connection between the blade and the crankshaft or stop rotation of the blade, both in response to operator control. Clutch/brake mechanism generally incorporate a control system for the operator to actuate from the usual operating station of the mower to select the clutch mode of the mechanism; the control also is adapted to select the brake mode of the mechanism when released by the operator. A large number of patents have issued disclosing various types of clutch/brake mechanisms, see e.g. U.S. Pat. Nos. 2,985,992; 3,247,654; 3,253,391; 3,837,450; 3,871,159; 4,044,533; 4,055,935; 4,122,652, 4,141,439; and 4,148,173.

We sought to achieve a number of important objectives with our new clutch/brake mechanism described herein. A principal goal of this invention was to develop a clutch/brake mechanism that would eliminate or greatly reduce the likelihood that its clutch and brake components would be engaged simultaneously. Another was to provide a mechanism in which such an objectionable consequence was rendered unlikely by making the clutch and brake functions each dependent upon shifting an axially movable element between one or the other of two axially spaced apart locations. Still another was to devise a clutch/brake mechanism that was of relatively simple construction and yet capable of combining quick and effective clutching and braking operations.

DISCLOSURE OF INVENTION

We have now developed a new clutch/brake mechanism comprising the combination of a driving clutch member secured to the drive shaft of a power source such as an internal combustion engine, a stationary brake member that is fixed in position relative to the power source and spaced axially from the driving clutch member in relation to the drive shaft, and an axially movable carrier journaled about the drive shaft and arranged for axial movement relative to the drive shaft; the carrier includes wall structure defining a movable clutch element on one portion and a movable brake element on another portion and carries the rotatable part that is to be driven by the power source. The combination also includes means for selectively moving the carrier axially in one direction relative to the drive shaft into a first position in which its wall structure forming the movable brake element engages the stationary brake member to stop rotation of the rotatable part and in which its wall structure forming the movable clutch element is disengaged from the driving clutch member, and for moving the carrier axially in an opposite direction relative to the drive shaft into a second position in which its wall structure forming the movable brake element is disengaged from the stationary brake member and its wall structure forming the movable clutch element engages the driving clutch member in order to transmit rotary motion from the drive shaft of the power source to the rotatable part attached to the carrier. As an optional feature, the combination may also include yieldable means for accommodating over-travel of a manual control means associated with the clutch/brake mechanism greater than the amount of travel required to effect clutch engagement.

While this invention is especially concerned with the attainment of an improved clutch/brake mechanism for rotary lawn mowers, it is not limited to such machines. In the broader sense, the invention provides a useful means for selectively effecting a torque transmitting connection between coaxial driving and driven elements or preventing rotation of the driven element without interfering with continued rotation of the driving element.

We believe that our new clutch/brake mechanism provides for quick and effective braking of the rotatable part and efficient clutch engagement for rotation of the part when desired; a number of its various features and advantages are set forth throughout the description which follows.

The manner in which the invention achieves its purposes will be appreciated from the ensuing description and the accompanying drawings which exemplify the invention, it being understood that changes may be made in the specific apparatus disclosed herein without departing from the basic scope and technical concept of the present invention.

BRIEF DESCRIPTION OF DRAWINGS

The accompanying drawings illustrate a preferred embodiment of this invention in the best mode presently contemplated by us for the practical application of the principles of this invention, in which:

FIG. 1 is a schematic side view, with a portion broken away, of a walk-behind rotary lawn mower, the engine of which is equipped with a clutch/brake mechanism in accordance with this invention;

FIG. 2 is a horizontal sectional view of the clutch/brake mechanism along the plane of line 2—2 of FIG. 1;

FIG. 3 is a vertical sectional view through the clutch/brake mechanism along the plane indicated by the line 3—3 of FIG. 2 illustrating the presently preferred embodiment of the invention, showing a first position in which the brake is engaged and the clutch disengaged;

FIG. 4 is a vertical sectional view similar to FIG. 3 showing the clutch/brake mechanism in an intermediate condition in which both the brake and the clutch are disengaged;

FIG. 5 is a vertical sectional view similar to FIGS. 3 and 4 showing the clutch/brake mechanism in a second position with the clutch engaged and the brake disengaged;

FIG. 6 is a vertical sectional view similar to FIGS. 3–5 showing the clutch engaged, the brake disengaged and an over-travel condition of the control system associated with the clutch/brake mechanism; and FIG. 7 is an exploded perspective view of most of the elements of the clutch/brake mechanism as shown in FIGS. 2–6.

BEST MODE FOR CARRYING OUT THE INVENTION (1) Introductory Description

FIG. 1 illustrates a walk-behind rotary lawn mower 10 including a chassis 11 mounted on wheels 12 and a handle 13 by which the mower is guided and manipulated. The chassis comprises a top deck 14 and a depending peripheral skirt 15 that encloses the mower blade; a chute, not shown, may extend from the skirt to conduct grass from underneath the housing, into a collection bag if desired. A power source, herein illustrated as a single cylinder, vertical shaft internal combustion engine 16, has its base 17 attached to the top deck 14 of the chassis by bolts 17a. Some mowers are self-propelled, in which event an operator-controlled drive transmission (not shown) connects certain of the wheels—usually the back wheels—with the engine 16.

The mower is equipped with a control cable 18, preferably plastic coated, by which the operator manually controls a clutch/brake mechanism of the present invention, indicated generally by the reference numeral 19. The clutch/brake mechanism 19 is adapted to selectively either drivingly connect mower blade 20 with the drive shaft 21 of the engine for rotation of the blade or declutch the blade from the drive shaft and apply a brake to hold the blade against rotation without interfering with continued rotation of the drive shaft and, hence, without stopping the engine. When the power source is an internal combustion engine as illustrated, the drive shaft is the crankshaft of the engine which has a lower end portion that protrudes downwardly below the top deck 14 of the chassis.

(2) Description of Elements of the Clutch/Brake Mechanism

This portion of the description is made primarily with respect to FIG. 3, but reference also should be made to the exploded view of FIG. 7 for additional elucidation of the structural elements being described.

A dish-shaped shell or support housing 24 with an upper outwardly-turned upper collar 25, a cylindrical axial sidewall 26 and a bottom wall 27, is attached to the base 17 of the engine 16 by means of bolts 28 extending through the upper collar of the support housing. The bottom wall 27 of the support housing extends radially inwards from the sidewall 26 and has a central aperture 29 that surrounds the drive shaft 21 of the engine.

A dish-shaped shell or brake housing 30 is attached to the bottom wall of the support housing. The brake housing comprises an upper outwardly turned collar 31, a cylindrical axial sidewall 32, and a lower wall 33 extending radially inwards from the sidewall and having a central aperture 34 surrounding the drive shaft 21 of the engine. The lower wall 33 of the brake housing is formed with an annular ridge 35 spaced from the edge of the central aperture 34 to define a fixed lower spring seat 36 therebetween.

The support housing 24 and brake housing 30 may be conveniently manufactured as metal stampings. The lower wall 33 of the brake housing defines a stationary non-rotating brake member that is fixed in position with respect to the engine 16.

A ball bearing assembly 40 including an elongated inner race 41 and a shorter outer race 42 is journaled about the drive shaft 21 of the engine along a needle bearing 43 (a roller bearing or a plain bearing may be used instead of a needle bearing) that is press-fit within the inner race. The ball bearing assembly is located within the brake housing 30 except that the lower end of the inner race 41 extends through the central aperture 34 in the lower wall of the brake housing. A rotatable plate 44 (see also FIG. 2) positioned inside the brake housing 30 encircles the drive shaft 21 and includes an outer flange 45, a downwardly facing U-shaped channel 46 that has a movable upper spring seat 47, and an inturned annular flange 48 that engages the lower end of the outer race 42 of the ball bearing assembly. A retainer ring 48 is fixed to the top of the channel 46, as by welding, and extends over the top of the outer race 42. The outer race 42 of the ball bearing is thus held in place between the flange 48 of the rotatable plate and the retainer ring 49 attached to the channel 46 of the rotatable plate. The needle bearing 43 is mounted on the drive shaft 21 in a manner which permits the ball bearing assembly 40 to move axially along the drive shaft, for the purpose to be hereinafter described.

Compression brake spring 50 encircles the drive shaft 21 and is arranged with its lower end seated along the fixed lower spring seat 36 of the brake housing 30 and its upper end seated along the movable upper spring seat 47 of the rotatable plate 44. Thrust washer 51, of low friction material such as plastic, surrounds the upper end of the brake spring 50 and is interposed between the spring and the movable upper spring seat 47 to facilitate rotation of the plate 44 against the friction of the spring 50; a needle bearing or roller bearing can also be used for such purpose. Brake spring 50 acting against the rotatable plate 44 biases the ball bearing assembly 40 upwardly or away from the fixed lower wall 33 of the brake housing to the position illustrated in FIG. 3.

Means are provided for moving the ball bearing assembly 40 axially downwardly along the drive shaft 21 with a force superior to that of the brake spring 50. This means is shown as a ball cam mechanism in the illustrated embodiment consisting of a set of three cam balls 55 that are captured between ramps 56 formed in the rotatable plate 44 and opposing ramps 57 formed in the bottom wall 27 of the support housing 24. The balls 55 may be supported in ball holding ring 54 if desired, but the ring 54 is not an essential element of the ball cam mechanism. The ramps are curved as best shown in FIG. 7 and have a slanted bottom wall to provide a deep end 56a and 57a and a shallow end 56b and 57b. The bottom walls of the ramps can have various angles of slope; we have found 10 degrees of slope to be satisfactory. Each ramp 56 and ramp 57 forms an opposed pair of cam surfaces between which a cam ball 55 is confined. Three such balls 55 spaced 120 degrees apart as shown in FIGS. 2 and 7 are suitable. A control lever 58 projects from the rotatable plate 44 through a notch 59 formed in the brake housing 30 (see again FIGS. 2 and 7) and one end of the control cable 18 is attached to the outer end of the lever 58 by means of an end fitting 61 at the end of the cable which is inserted into a hole at the end of the lever 58. The control cable 18 is fed through a retainer clip 62 fastened to a stationary stop 63 attached to the brake housing 30. The opposite end of the control cable 18 is connected to a control lever 60

(FIG. 1) pivoted at 60a to the handle 13 of the mower and located to be conveniently actuated from the usual operating station of the mower. When the lever 60 is pivoted downwards to be positioned alongside the handle of the mower, the control cable 18 acting through control lever 58 causes the plate 44 to rotate (about 40 degrees of rotation has been found suitable, although the plate 44 can be designed to have a greater or lesser amount of rotation); the balls 55 then move from the deep end to the shallow end of the ramps 56 and 57, thereby forcing the ball bearing assembly 40 axially downwards along the drive shaft 21 against the action of the brake spring 50. A shield 64 is positioned inside the brake housing to close the notch 59 and arranged to move with the rotatable plate 44 to thereby reduce the entry of dirt and other foreign matter into the brake housing and is arranged to move with the rotatable plate 44.

An axially movable carrier 65 is supported about the lower end of the inner race 41 of the ball bearing assembly 40. The carrier 65 in the illustrated form is an inverted drum-like structure having a wall structure including an end wall 66 extending radially outward from the drive shaft connected to a frustoconical wall portion 67 which is joined to a short cylindrical wall 68. The end wall 66 has a central aperture 69 that fits closely about the inner race 41 of the ball bearing assembly, and the carrier 65 is held onto the inner race by means of a retainer ring 70 seated in a circumferential groove 71 in the inner race. The bottom of the carrier 65 is closed by a cover plate 72. The mower blade 20 is attached to a pair of oppositely disposed ears 73 extending from the lower edge of the carrier. The wall of the carrier defines a movable brake element 75 along an annular portion of the upper surface of its end wall 66, which may carry friction material 75a, and also defines a movable clutch element 76 along a portion of the inner surface of its frustoconical wall 67, which may carry friction material 76a. The friction material 75a and 76a may each be in the form of a ring or a set of spaced arcuate pads or segments. Also, the friction material 75a may be attached to the lower wall 33 of the brake housing instead of the carrier 65.

A driving disc 80 is secured to the tapered lower end of the drive shaft 21 by means of bolt 81 and washer 82. The driving disc 80 is enclosed within the carrier 65 and has an upwardly facing frustoconical surface 83 that substantially matches and opposes the frustoconical wall 67 of the carrier. The friction material 76a may be attached to the surface 83 instead of the wall of the carrier as previously described.

At this point, it is important to note that the carrier 65 as described above is a member capable of axial movement relative to the drive shaft of the engine and it includes wall structure defining a movable clutch element on one of its surfaces and a movable brake element on another of its surfaces. The driving disc is a fixed driving clutch member secured to the drive shaft for rotation therewith.

A group of Belleville springs 85 are confined between a downwardly facing shoulder 86 on the inner race 41 of the ball bearing assembly and the top of the end wall 66 of the carrier 65 immediately surrounding the inner race. One of the purposes of the Belleville springs is to accommodate over-travel of the control system connected to the control lever 58 of the rotatable plate 44, as will be more fully described below. The carrier 65 is held against the retainer ring 70 by the pre-load of the Belleville springs, which may generally be in the range of about 50–100 lbs.

(3) Operation of the Clutch/Brake Mechanism

FIG. 3.

FIG. 3 illustrates the first position of the clutch/brake mechanism 19 of the present invention in which the brake is engaged and the clutch is disengaged. This is the normal position of the clutch/brake mechanism whenever the engine is stopped or whenever the engine is operating but the clutch is not engaged. The lever 60 associated with the control cable 18 is in its upright or release position as illustrated in FIG. 1. The rotatable plate 44 is in a position in which the balls 55 of the ball cam mechanism are located in the deep ends 56a and 57a of the ramps 56 and 57 formed in the rotatable plate 44 and the bottom wall 27 of the support housing 26 respectively. There is a space between each ball and the bottom wall of the ramps 57 as shown in FIG. 3, so that the balls do not contact the ramps 57 in this position. The brake spring 50 acts against its fixed lower spring seat 36 formed as part of the bottom wall 33 of the brake housing, and exerts force against its movable upper spring seat 47 which is a portion of the rotatable plate 44. This spring force acting against the upper spring seat has moved the ball bearing assembly 40 and its associated needle bearing 43 axially upwardly along the drive shaft 21 of the engine until its upward movement is limited by the movable brake element 75 of the carrier engaging the stationary brake member comprising the lower wall 33 of the brake housing. When the ball bearing assembly 40 is in this position, the carrier 65 is held against the retainer ring 70 located at the lower end of the inner race 41 of the ball bearing assembly and its movable clutch element 76 is disengaged from the clutch surface 83 of the driving disc 80 secured to the drive shaft of the engine. The axially movable carrier 65 is thus in a first position in which the brake is engaged and the clutch disengaged, which enables the engine to be started and operated while the mower blade is held against rotation because of the engagement between the movable brake element and the stationary brake member.

FIG. 4.

When the operator desires to have the mower blade 20 rotate for cutting purposes, the lever 60 associated with the control cable 18 is pivoted downwardly to an operating position alongside the handle of the mower. This causes the control cable 18 to rotate the rotatable plate 44 in the direction of arrow A in FIG. 2, which rotation of plate 44 causes the balls 55 of the ball cam mechanism to move towards the shallow ends 56b and 57b of the ramps 56 and 57 formed in the rotatable plate 44 and the bottom wall 27 respectively. The rotatable plate 44 is thereby forced downwardly away from the bottom wall 27 of the housing 26, which in turn moves the ball bearing assembly 40 axially down along the drive shaft 21 of the engine. Such downward movement of the ball bearing assembly causes the carrier 65 to move downward because the Belleville springs 85 have a preload force at this stage and in effect act as a solid member holding the carrier against the retainer ring 70. When downward movement of the carrier is initiated, the brake element 75 thereof disengages from the stationary brake member 33; after disengagement of the brake components, downward movement of the carrier continues for a short distance during which neither the brake nor the clutch is engaged, which is the intermediate condition illustrated in FIG. 4.

FIG. 5.

Downward movement of the carrier 65 continues until the second position shown in FIG. 5 is reached wherein the clutch element 76 of the carrier engages the clutch surface 83 of the driving disc 80 and torque is transmitted from the driving disc 80 to the carrier to rotate the latter and thereby cause the mower blade 20 to rotate for cutting action. Furthermore, during downward movement of the assembly, the brake spring 50 is compressed between its fixed lower spring seat 36 and movable upper spring seat 47. The clutch/brake mechanism is now in a second position wherein the stationary brake member and movable brake element are disengaged from one another but the driving clutch member and the movable clutch element are engaged to establish a driving connection between the engine and the mower blade. An amount of travel of the carrier between its first and second positions can be selected which is appropriate for any particular installation, but it should be sufficient to ensure that the clutch/brake mechanism has an intermediate condition in which neither the clutch nor the brake is engaged; in a specific construction of the clutch/brake mechanism 19, we have found 1/16" of axial travel between these two positions to be suitable.

FIG. 6.

After the clutch/brake mechanism has reached the clutch engaged position shown in FIG. 5, it is useful to provide a means for accommodating over-travel of the manual control means such as the cable 18 associated with the mechanism. "Over-travel" is defined herein as meaning movement of the manual control means beyond the amount of travel needed to obtain a clutch engagement. The Belleville springs 85 are included in the assembly for this purpose. Once the control cable 18 has moved sufficiently for the assembly to reach the clutch engaged position of FIG. 5, axial movement of the carrier 65 is stopped. If the control cable 18 has not reached its limit of travel at this point, further movement of the cable results in downward movement of the rotatable plate 44 relative to the fixed bottom wall 27 of the support housing so as to move the ball bearing assembly 40 axially downward along the drive shaft a distance over and above that required to effectuate clutch engagement, during which movement the Belleville springs 85 compress to the condition shown in FIG. 6. In order to prevent flattening or overcompression of the Belleville springs 85, it is useful to provide means for limiting the amount of rotation that can be imparted to the rotatable plate 44. For that purpose, and as best shown in FIGS. 2 and 7, the control lever 58 includes a projecting stop arm 90 that has a downwardly-turned tab 91 at its outer end. An adjustable stop screw 92 is threaded through the tab 91. The stationary stop 63 has a U-shaped configuration including an end wall 93. When the end of stop screw 92 contacts the end wall 93 of the stationary stop, rotation of the rotatable plate 44 is halted, thereby preventing undue compression of the Belleville springs 85. Thus the Belleville springs of the illustrated embodiment provide a yieldable means for accommodating over-travel of the manual control means beyond the amount required to move the carrier 65 to its second or clutch engaged position. (In an actual embodiment of the clutch/brake mechanism 19 the amount of the over-travel was 3/32", although this can be varied as desired.) This also provides a system for compensating for wear of the manual control means associated with the rotatable plate, correcting for deflection or maladjustments in the control means and correcting for wear of the clutch friction material. In addition, the Belleville springs 85 act to soften the engagement of the clutch elements of the clutch/brake mechanism, and they limit the amount of downward thrust applied to the crankshaft of the engine after the clutch has been engaged so as not to exceed the capacity of the thrust bearing in which the crankshaft is supported.

When the operator allows the lever 60 associated with the control cable 18 to assume its release position shown in FIG. 1, the compressed brake spring 50 is also released and the force generated thereby is exerted against the rotatable plate 44; because of the tapered ramps 56 and 57, the resultant forces enable the balls 55 of the ball cam mechanism to move to the deep ends of the ramps. This allows the plate 44 to rotate in a direction opposite to arrow A in FIG. 2 and move upwards so as to move the ball bearing assembly 40 axially upwardly along the drive shaft 21; by reason of this motion, the carrier 65 also is moved upwardly so that the movable clutch element 76 becomes disengaged from the clutch surface 83 to the driving disc 80. The carrier is braked against rotation as soon as its movable brake element 75 contacts the stationary brake member comprising the lower wall 33 of the brake housing, at which point upward movement of the bearing assembly is stopped. The clutch/brake mechanism 19 is then in its first position illustrated in FIG. 3.

A presently preferred embodiment of our invention has been described in sufficient detail to enable those skilled in the art to make and use the invention. However, various modifications to the described embodiment may be made that will remain within the scope of this invention. While the support housing 24 and brake housing 30 are illustrated as separate entities in the foregoing embodiment, both housings can be combined into a single unit if desired. The support housing itself can be eliminated entirely by attaching the brake housing to one or more bosses extending from the base of the engine. Thus any suitable structure which will provide a stationary brake member can be substituted for the brake and support housings as described. Belleville springs 85 are illustrated as the yieldable means for accommodating over-travel of the manual control means and for the other indicated purposes. Various types of springs can be used for this portion of the mechanism, such as wave springs, finger springs and compression springs. Also, the yieldable means can be associated with the manual control means rather than being arranged to act directly upon the ball bearing assembly 40; for example, a suitable spring outside the housing for the ball bearing assembly can be connected with the control cable 18 that is part of the manual control means actuated by the operator. Other suitable means for moving the ball bearing assembly 40 in an axial direction relative to the engine drive shaft or crankshaft can be substituted for the ball cam mechanism herein illustrated, such as crank or lever systems or a yoke acting upon the assembly. While the ball bearing assembly 40 and the axially movable carrier 65 are depicted as being journaled directly on the drive shaft 21 of the engine, these elements can be journaled about a hub projecting from the base of the engine to encircle the drive shaft and they can thereby be arranged for axial movement about or relative to the drive shaft. The carrier 65 and the driving disc 80 are illustrated as having mating frustoconical clutch surfaces; a flat disc type clutch can be used for these elements such as by utilizing a portion of the underside of the end wall 66 of the carrier to engage the flat top surface of the driving disc 80. The frustoconical clutch as illustrated is especially useful because it provides for centering the blade about the drive shaft of the engine in addition to its clutching function. Various other modifications will suggest themselves to those skilled in the art upon reading this specification that will remain within the scope of the present invention.

INDUSTRIAL APPLICABILITY

The clutch/brake mechanism as described hereinabove incorporates a number of technical features which can be advantageous in various types of machines, including rotary lawn mowers.

The blade, or other rotatable part to be driven by the apparatus, is attached to a carrier designed to move axially relative to the drive shaft of an engine or other suitable power source, and the carrier incorporates a movable brake element and a movable clutch element. The carrier is arranged for reciprocal movement between a stationary brake member and a fixed driving clutch member. This arrangement of the several parts to one another provides a construction in which either the brake is engaged or the clutch is engaged, but the clutch and the brake cannot be engaged simultaneously.

Second, the use of a driving clutch element fixed to the drive shaft of the engine enables the element to provide added flywheel mass to the engine if required. Thus, in engines that have a relatively low flywheel mass at the top of the engine drive shaft or crankshaft, the driving clutch element can be made heavy enough to provide additional inertia as required to achieve satisfactory engine operation; with engines that have a relatively heavy flywheel at the top of the drive shaft, the driving clutch member can be light in weight so as to add little inertia.

Third, the blade in a lawn mower is located by the driving clutch element which is secured to the drive shaft, rather than being located by a separate bearing incorporated in the structure.

Fourth, the addition of the yieldable means to accommodate over-travel of the manual control means associated with the clutch/brake mechanism provides the feature of allowing for misadjustment of wear of various components of the mechanism without imposing undue stress on the clutch or engine elements.

The clutch/brake mechanisms described herein are suitable for walk-behind mowers which are pushed by the operator, lawn mowers which are self-propelled through the incorporation of an additional drive system from the drive shaft of the engine to some of the wheels, and for riding mowers. The present clutch/brake mechanism can be employed in conjunction with a lawn mower self-propelling drive that is independent of the clutch/brake, which enables a lawn mower incorporating the present clutch/brake mechanism to be moved by a self-propelling drive without the blade rotating since the operator can control either system independently of the other; this feature is not possible with some of the prior art clutch/brake devices.

Another advantageous feature is that the operator can control the speed of clutch engagement with the present clutch/brake mechanism. By this is meant that the operator can "feather" the clutch into engagement, which is particularly useful with a cold engine; this action is not possible with a self-energizing clutch which engages on its own once the operator initiates the clutch engagement action.

Further, the power or torque capacity of the clutch/brake mechanism herein described is not dependent upon engine speed and its proper operation is independent of a governor device associated with an engine, as distinguished from clutch/brake mechanisms that incorporate centrifugal clutches whose action is directly related to engine speed and which are thereby affected by the operation of a governor speed device employed with an engine.

All of the foregoing advantages are incorporated in a clutch/brake mechanism which can be made in such a manner as to avoid the use of spline connections, key connections, interleaved clutches, etc., that may increase the cost of manufacturing and installing the unit.

We claim:

1. A combination clutch/brake mechanism for selectively effecting a torque transmitting connection between coaxial driving and driven means for preventing rotation of the driving element without interfering with continued rotation of the driving element comprising:
    a drive shaft
    a driving disc connected to the shaft and having a clutch surface,
    a bearing assembly mounted for axial movement on said shaft and having a first rotatable portion and a second portion,
    a carrier connected to the rotatable portion of said bearing assembly and carrying an element to be driven, said carrier having spaced apart first and second surfaces, said first surface being cooperable with said clutch surface of said disc to effect transmission of torque from the disc to the driven element,
    a stationary brake member having a brake surface cooperable with the second surface of the carrier to hold said carrier against rotation,
    resilient means interconnecting said bearing assembly and said stationary brake member for urging said bearing assembly axially of said shaft in one direction to thereby effect engagement of said second surface of the carrier with said brake surface,
    operating means operably connected to the second portion of said bearing assembly for moving said bearing assembly axially of said shaft in the opposite direction to thereby effect engagement of the first surface of said carrier with said clutch surface and transmit torque from said disc to said carrier, and
    second resilient means interconnecting said bearing assembly and said carrier, said second resilient means being arranged so that continued movement of said bearing assembly in said opposite direction after engagement of the first surface of said carrier with said clutch surface will compress said second resilient means to permit overtravel of said operating means beyond that needed to obtain clutch engagement.

2. The combination of claim 1, wherein the rotatable portion of said bearing assembly is slidable on said shaft and said second portion is disposed radially outward of said rotatable portion.

* * * * *